(12) United States Patent
Tiedemann, Jr.

(10) Patent No.: US 8,345,728 B2
(45) Date of Patent: *Jan. 1, 2013

(54) METHOD AND APPARATUS FOR TRANSMITTING AND RECEIVING HIGH SPEED DATA USING CODE DIVISION MULTIPLE ACCESS CHANNELS

(75) Inventor: Edward G. Tiedemann, Jr., San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

This patent is subject to a terminal disclaimer.

(21) Appl. No.: 12/471,885

(22) Filed: May 26, 2009

(65) Prior Publication Data

US 2009/0252141 A1  Oct. 8, 2009

Related U.S. Application Data

(60) Division of application No. 11/401,971, filed on Apr. 10, 2006, now Pat. No. 7,675,961, which is a continuation of application No. 09/113,770, filed on Jul. 10, 1998, now Pat. No. 7,027,484.

(51) Int. Cl.
  *H04B 1/00* (2006.01)
(52) U.S. Cl. ........ 375/146; 375/295; 370/320; 370/441; 455/70; 455/103
(58) Field of Classification Search .................. 375/146, 375/135, 295; 455/70, 103; 370/320, 441, 370/302

See application file for complete search history.

(56) References Cited

U.S. PATENT DOCUMENTS

| | | |
|---|---|---|
| 4,901,307 A | 2/1990 | Gilhousen et al. |
| 5,101,501 A | 3/1992 | Gilhousen et al. |
| 5,103,459 A | 4/1992 | Gilhousen et al. |
| 5,109,390 A | 4/1992 | Gilhousen et al. |
| 5,166,951 A | 11/1992 | Schilling |
| 5,222,098 A | 6/1993 | Yamamoto et al. |
| 5,341,396 A | 8/1994 | Higgins et al. |
| 5,359,419 A | 10/1994 | Kawasaki |
| 5,424,664 A | 6/1995 | Phillips |
| 5,442,625 A | 8/1995 | Gitlin et al. |
| 5,598,416 A | 1/1997 | Yamada et al. |
| 5,623,487 A | 4/1997 | Natali |
| 5,649,000 A | 7/1997 | Lee et al. |

(Continued)

FOREIGN PATENT DOCUMENTS

CN  1183865  6/1998

(Continued)

OTHER PUBLICATIONS

International Search Report, ISA European Patent Office, International Application No. PCT/US99/15703, Nov. 10, 1999.

(Continued)

*Primary Examiner* — Ted Wang
(74) *Attorney, Agent, or Firm* — Larry J. Moskowitz; Howard H. Seo

(57) ABSTRACT

The present invention describes a spread spectrum communication system wherein the frequency of carriers and the code channels of the carriers or both for transmission to a given remote station user vary in time. This provides for a direct sequence spectrum communications system which changes frequency or code channel according to a predetermined pattern. The code channels and frequencies can be determined in accordance with a deterministic function or based upon a subset of the data to be transmitted. A receiver structure is also described for receiving the same.

33 Claims, 10 Drawing Sheets

U.S. PATENT DOCUMENTS

| | | | |
|---|---|---|---|
| 5,758,266 A | 5/1998 | Kornfeld et al. | |
| 5,777,990 A | 7/1998 | Zehavi et al. | |
| 5,852,630 A | 12/1998 | Langberg et al. | |
| 5,864,577 A | 1/1999 | Ramel | |
| 6,064,663 A | 5/2000 | Honkasalo et al. | |
| 6,185,199 B1 | 2/2001 | Zehavi | |
| 6,215,777 B1 | 4/2001 | Chen et al. | |
| 6,360,080 B1 | 3/2002 | Yun et al. | |
| 6,389,000 B1 | 5/2002 | Jou | |
| 6,396,823 B1 | 5/2002 | Park et al. | |
| 6,493,410 B1 | 12/2002 | Shalom et al. | |
| 6,795,508 B1 | 9/2004 | Odenwalder et al. | |
| 7,027,484 B1 | 4/2006 | Tiedemann, Jr. | |
| 7,675,961 B2 | 3/2010 | Tiedemann, Jr. | |
| 8,040,936 B2 | 10/2011 | Tiedemann, Jr. | |

FOREIGN PATENT DOCUMENTS

| | | |
|---|---|---|
| EP | 0601519 | 6/1994 |
| JP | 4047726 A | 2/1992 |
| WO | 9636132 | 11/1996 |

OTHER PUBLICATIONS

European Search Report, European Patent Office, European Application No. EP01130855, Apr. 19, 2002.

Written Opinion—PCT/US99/015703 International Search Authority—European Patent Office—Sep. 11, 2000.

METHOD AND APPARATUS FOR TRANSMITTING AND RECEIVING HIGH SPEED DATA USING CODE DIVISION MULTIPLE ACCESS CHANNELS

CLAIM OF PRIORITY UNDER 35 U.S.C. §120

The present application for patent is a Divisional application of application Ser. No. 11/401,971 filed Apr. 10, 2006, which is a Continuation of application Ser. No. 09/113,770 entitled, "Method and Apparatus for Transmitting and Receiving High Speed Data Using Code Division Multiple Access Channels" filed Jul. 10, 1998, now allowed, and assigned to the assignee hereof and hereby expressly incorporated by reference herein.

BACKGROUND

1. Field

The present invention relates to communications. More particularly, the present invention relates to a novel and improved communication system wherein the user transmits data using code division multiple access communication channels which are transmitted in varying frequency bands and varying code channels.

2. Background

The present invention is concerned with transmitting data at rates which are higher than the capacity of a single code division multiple access (CDMA) channel.

Many solutions to this problem have been proposed. One such solution is to allocate multiple CDMA code channels to the users and allow those users to transmit data in parallel on the plurality of code channels available to them. Two methods for providing multiple CDMA channels for use by a single user are described in copending U.S. patent application Ser. No. 08/431,180, entitled "METHOD AND APPARATUS FOR PROVIDING VARIABLE RATE DATA IN A COMMUNICATIONS SYSTEM USING STATISTICAL MULTIPLEXING", filed Apr. 28, 1997 and U.S. Pat. No. 5,777,990 entitled "METHOD AND APPARATUS FOR PROVIDING VARIABLE RATE DATA IN A COMMUNICATIONS SYSTEM USING NON-ORTHOGONAL OVERFLOW CHANNELS", issued Jul. 7, 1998, both of which are assigned to the assignee of the present invention and are incorporated by reference herein. In addition, frequency diversity can be obtained by transmitting data over multiple spread spectrum channels that are separated from one another in frequency. A method and apparatus for redundantly transmitting data over multiple CDMA channels is described in U.S. Pat. No. 5,166,951, entitled "HIGH CAPACITY SPREAD SPECTRUM CHANNEL", which is incorporated by reference herein.

CDMA modulation provides one means for establishing communication between users in a large system which includes a number of such users. Other techniques, such as time division multiple access (TDMA), frequency division multiple access (FDMA) and AM modulation schemes (such as amplitude companded single sideband (ACSSB)) are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention and incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of the utilization of path diversity are illustrated in copending U.S. Pat. No. 5,101,501 entitled "SOFT HANDOFF IN A CDMA CELLULAR TELEPHONE SYSTEM", and U.S. Pat. No. 5,109,390 entitled "DIVERSITY RECEIVER IN A CDMA CELLULAR TELEPHONE SYSTEM", both assigned to the assignee of the present invention and incorporated by reference herein.

SUMMARY OF THE INVENTION

In a first embodiment of a transmitter in accordance with the present invention, data is encoded, spread and provided to a bank of upconverters, each associated with a unique local oscillator. Each upconverter upconverts the spread data to a different center frequency. A switch selects one of the upconverted signals in accordance with a deterministic pseudorandom sequence. Alternatively, the spread data is provided to an upconverter which is driven by a variable frequency synthesizer which generates a signal having a frequency determined in accordance with a deterministic pseudorandom sequence.

Three embodiments of a receiver are presented for receiving the data transmitted by the first transmitter embodiment. In a first receiver embodiment, the received data is passed to a bank of down converters driven by local oscillators, each of which is tuned to a different frequency. The downconverted data is provided to a switch which selects one of the downconverted data streams in accordance with a delayed version of the deterministic sequence used to select the upconversion frequency. In a second receiver embodiment, the received data is provided to a downconverter that downconverts the signal using the output of a variable frequency synthesizer which selects its output frequency in accordance with a delayed version of the deterministic sequence used to select the upconversion frequency. In a third receiver embodiment, the received data is provided to a bank of down converters, each of which downconverts the signal in accordance with a different center frequency. The downconverted signals are, then, despread and decoded. A control processor then selects which of the received signals to output based on values (commonly referred to as "quality metrics") calculated to determine the quality of a received frame of data, such as: (1) the results of a cyclic redundancy check, (2) the symbol error rate, and (3) trellis metrics, such as the Yamamoto metric.

In a second embodiment of the transmitter of the present invention, a subset of the information bits to be transmitted are used to select the center frequency of the spread spectrum signal. In one embodiment, the data is packetized, encoded and spread. The spread data is provided to a bank of upconverters, each of which upconvert the spread data to a different center frequency. An upconverted stream of data is then selected from among the streams of data output from the bank of upconverters, based upon a subset of the upconverted stream of data to be transmitted. Alternatively, the data is packetized, encoded, spread and provided to an upconverter that upconverts the data in accordance with a signal generated by a variable frequency synthesizer that selects its output frequency based on a subset of the information bits to be transmitted.

At the receiver, the received data is provided to a bank of down converters each of which downconverts the signal in accordance with a different center frequency.

The down converted signals are despread and decoded. A control processor then selects which of the received signals to output based on frame quality metrics, such as: (1) the results of a cyclic redundancy check, (2) the symbol error rate, and (3) trellis metrics, such as the Yamamoto metric. The decoded data, as well as a data corresponding to the frequency on which the data was received, is demultiplexed into an output data stream.

In a third embodiment of the transmitter of the present invention, each transmitter is given a plurality of code channels upon which it can transmit data. The transmitter selects the code channel upon which to transmit the data in accordance with a subset of the information data to be transmitted. At the receiver, the received data is provided to a bank of code channel dechannelizers. Each of the despread signals is provided to a decoder. The decoded data is provided to a control processor which selects data to output and demultiplexes that data with the bits corresponding to the code channel upon which the data was received.

In the fourth embodiment of the present invention, a subset of the information bits to be transmitted is used to select both the upconversion frequency of the spread spectrum signal and the code channel upon which the signal is to be transmitted. At the receiver, the received data is provided to a bank of downconverters, each of which downconverts the signal in accordance with a different center frequency. Each of the down converted signals is in turn provided to a bank of code channel dechannelizers. Each of the despread signals is provided to a decoder. The decoded data is provided to a control processor which selects the decoded data to output and demultiplexes that data with the data corresponding to the code channel upon which the data was received and to the frequency channel upon which the data was received.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

Figure 1:
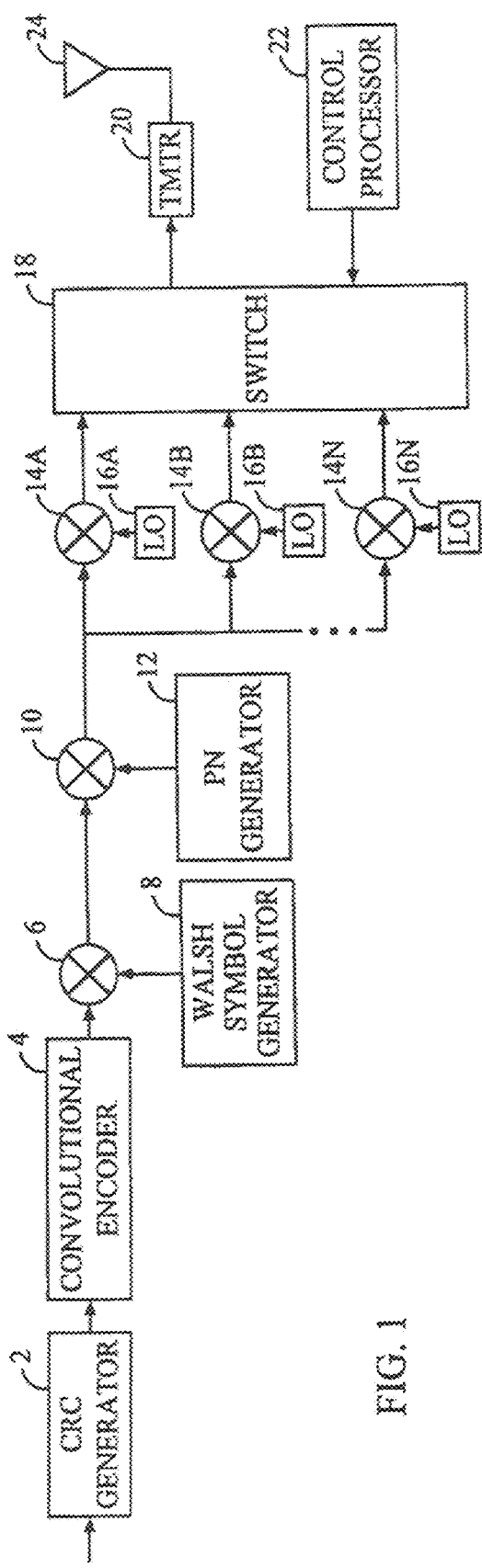
FIG. 1 is a diagram illustrating an one embodiment of the present invention in which the CDMA channel is frequency hopped based on a deterministic signal using a bank of down converters.

FIG. 1 illustrates the first embodiment of the present invention, wherein the CDMA channels change frequency in accordance with a deterministic signal. The information data to be transmitted is provided to Cyclic Redundancy Check (CRC) generator 2. CRC generator 2 generates and appends a set of bits that can be used to check the correctness of the decoded data at the receiver. The information data, together with the appended set of bits from CRC generator 2, is provided to encoder 4. In one embodiment, encoder 4 is a convolutional encoder, though the present invention is equally applicable to any error correction encoder. Convolutional encoders are well known in the art. In one embodiment, the convolutional encoder also includes an interleaver. Interleavers are also well known in the art.

The encoded symbols are then provided to channelizer 6 which spreads the encoded symbols in accordance with a spreading sequence provided by sequence generator 8. In the one embodiment, sequence generator 8 is a Walsh symbol generator that provides sequences of symbols in accordance with orthogonal Walsh sequences. This is used to separate the channels in a CDMA system. The Walsh sequence data is provided to scrambling means 10 which scrambles the data in accordance with a pseudorandom sequence provided by PN generator 12. Channelizers and sequence generators are well known in the art and are described in detail in the aforementioned U.S. Pat. No. 5,103,459. It should be noted that many other combinations of channelizer and scrambler are also possible as long as the result is to channelize the various users. The embodiment shown distinguishes channels from one another by orthogonal Walsh encoding followed by a scrambler. However, other orthogonal sequences can also be used to provide channelization. Furthermore, the channelization does not have to be performed by a set of orthogonal sequences. For example, a single stage channelizer where each user is assigned a different PN code could be used.

The scrambled data is provided to a bank of mixers 14a-14n. Each mixer is driven by a corresponding local oscillator 16a-16n. The upconverted data from each of mixers 14a-14n is provided to switch 18. In the preferred embodiment, the local oscillator frequencies are equally separated in frequency, so that the frequency of the $n^{th}$ LO is $f_0 + N\Delta_{lo}$. In the preferred embodiment, the local oscillator frequencies are separated by the chip rate of the PN generator or by some multiple thereof so that $\Delta_{lo}$ is the chip rate or some multiple of the chip rate. Switch 18 selects which one of the upconverted signals is to provide to coupled to transmitter (TMTR) 20. The upconverted signal that is provided to transmitter 20 is selected in accordance with a signal provided by control processor 22. In the illustrated embodiment, control processor 22 generates the selection signal based on a pseudorandom process. The pseudorandom process can be generated using any one of many methods which are well known in the art for generating such sequences. For example, the pseudorandom sequence can be generated by a linear or non-linear feedback shift register. It may also be generated by a cryptographic keystream generator. Any of these techniques can use an identity of the mobile station, such as the electronic serial number (ESN), a public key, or a secret key. These techniques are well known in the art. In an alternative embodiment, the selection signal can be a sequential selection of the first, then second up to the n-th upconverted signal. In another alternative embodiment, the selected frequency may be based upon channel conditions. The receiving system may measure the performance of each channel and then feed the preferred frequency back to the transmitter for use. This may be done by monitoring a signal which is continuously transmitted, such as a pilot. The selected signal is provided to transmitter 20 which filters and amplifies the signal and provides it for transmission through antenna 24. It should be understood that in the preferred embodiment of the present invention, at least one other signal similarly generated will be multiplexed together. Preferably, the number of such similarly generated signals will be equal to the number of mixer 14 and local oscillator 16 combinations. For example, in the case of the embodiment illustrated in FIG. 1, three such signals will be multiplexed and transmitted through transmitter 20. Accordingly, data from three different sources (and coupled to the transmitter from three different switches 18, only one of which is shown) will be multiplexed together before transmission by the transmitter 20. Each switch 18 selects a mixer 14 that is coupled to a local oscillator 16 that is operating at a different frequency from the frequency of each of the other local oscillators 16 generating the signals that are being concurrently selected by each other switch 18.

Figure 2A:
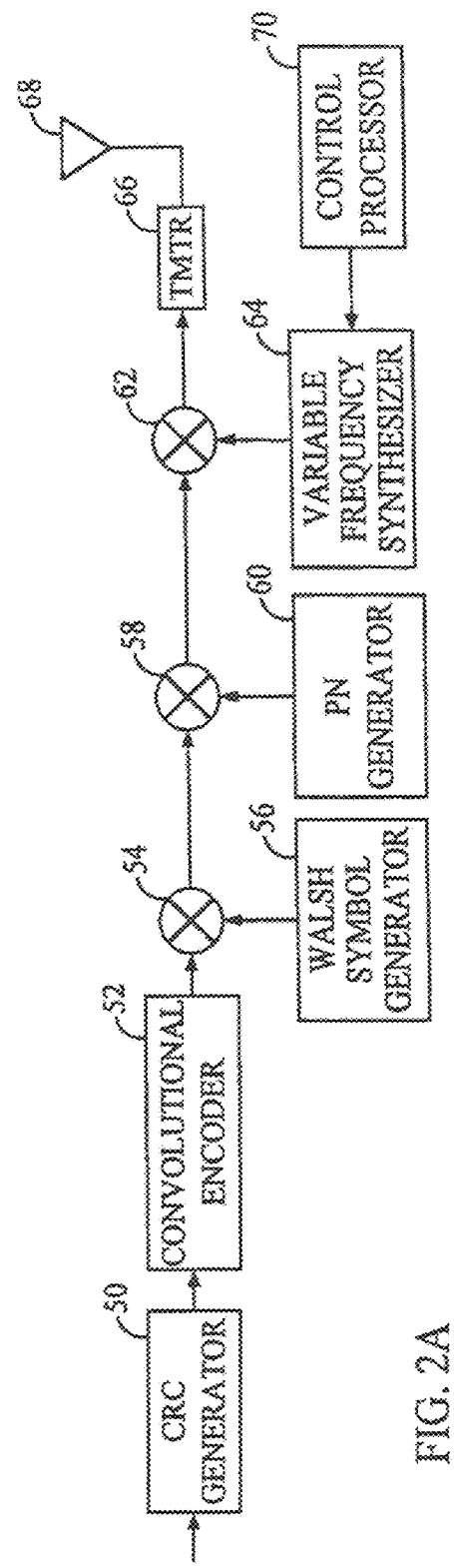
FIG. 2a is a diagram illustrating one embodiment of the present invention in which the CDMA channel is frequency hopped based on a deterministic signal using a variable frequency synthesizer.

FIG. 2a illustrates an alternative implementation of the first embodiment wherein the bank of upconverters is replaced with a variable frequency synthesizer. The information data to be transmitted is provided to Cyclic Redundancy Check (CRC) generator 50. CRC generator 50 generates and appends a set of bits that can be used to check the correctness of the decoded data at the receiver. The bits from CRC generator 50 are provided to encoder 52. In one embodiment, encoder 52 is a convolutional encoder.

The encoded symbols are then provided to channelizer 54 which channelizes the encoded symbols in accordance with a code sequence provided by sequence generator 56. In one embodiment, sequence generator 56 is a Walsh symbol generator that provides sequences of code symbols in accordance with orthogonal Walsh sequences. The Walsh sequence data is provided to scrambling means 58 which scrambles the data in accordance with a pseudorandom sequence provided by PN generator 60. Channelizers and sequence generators are well known in the art and are described in detail in the aforementioned U.S. Pat. No. 5,103,459.

The scrambled data is provided to mixer 62. Mixer 62 is driven by variable frequency synthesizer 64. Variable frequency synthesizer 64 outputs a driving frequency to mixer 62 in accordance with a signal provided by control processor 70. In one embodiment, control processor 70 generates the frequency selection signal based on a pseudorandom process. In an alternative embodiment, the selection signal can be a sequential selection of the first, then second up to the n-th upconverted signal. The upconverted signal is provided to transmitter 66 which filters and amplifies the signal and provides it for transmission through antenna 68. Accordingly, in an embodiment in which the frequency synthesizer 64 generates three frequencies, a signal generated will have a first frequency for a first period of time, a second frequency for a second period of time, and a third frequency for a third period of time. This sequence will repeat, such that the frequency of the signal generated will alternate between the three frequencies over time.

In one embodiment of the present invention, in order to ease the burden on the receiver, a phase relationship is maintained between the signal generated by the variable frequency synthesizer having a first frequency at a first period in time and the signal generated by the variable frequency synthesizer having that first frequency, but at each later time.

Figure 2B:
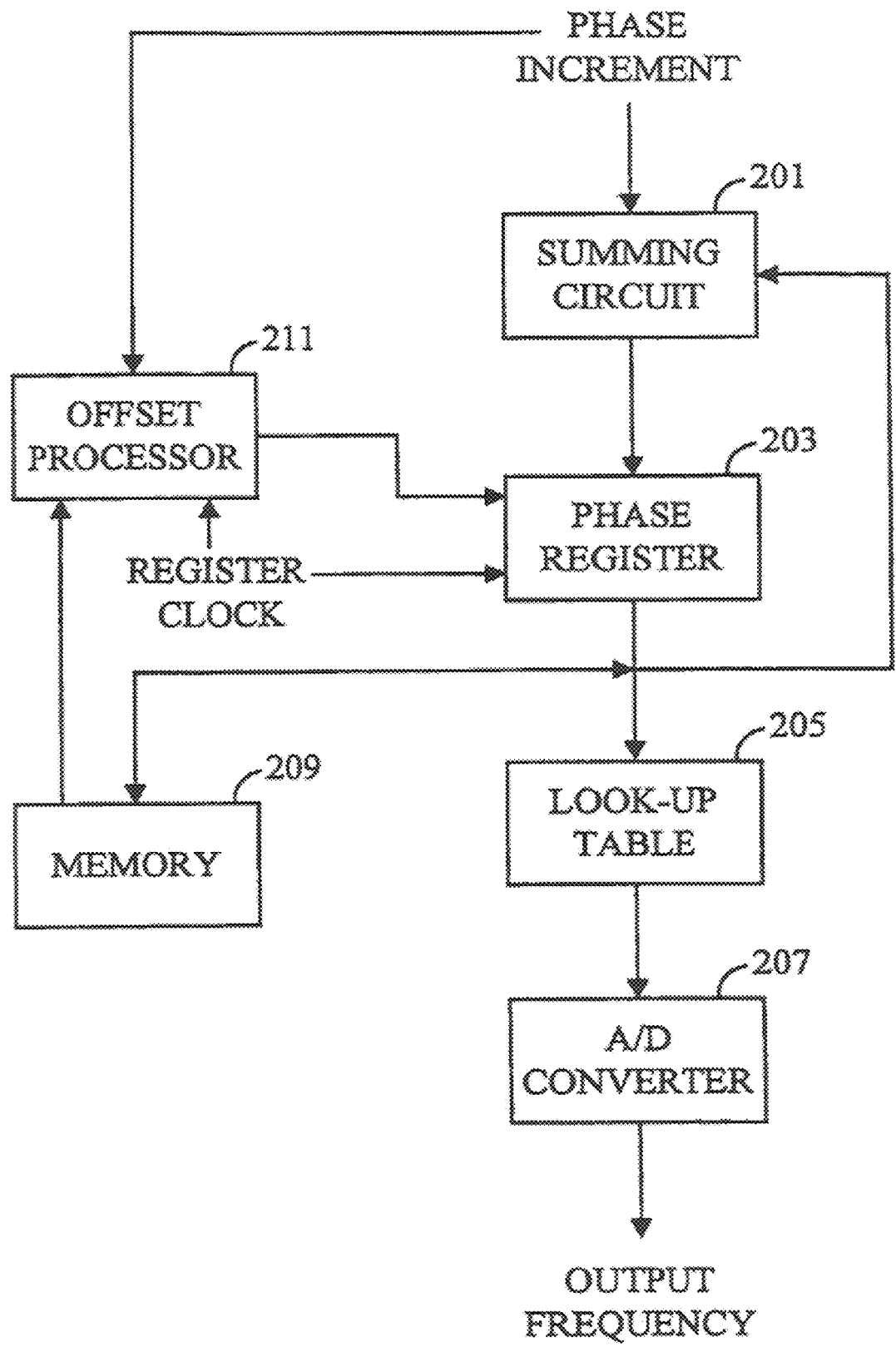
FIG. 2b is a simplified block diagram of a DDS in accordance with one embodiment of the present invention.

In accordance with one embodiment of the present invention, the relationship between the phase of the signal over time is established by using a direct digital synthesizer (DDS) as follows. FIG. 2b is a simplified block diagram of a DDS in accordance with one embodiment of the present invention. The DDS shown in FIG. 2b comprises summing circuit 201, phase register 203, look-up table 205, and analog to digital converter (A/D) 207. A phase increment signal is applied to a first input to summing circuit 201. The output from the phase register 203 is applied to a second input to the summing circuit 201. The output from the summing circuit is stored in the phase register 203. A register clock is applied to the phase register to shift the value at the input of the register 203 to the output. Therefore, after each cycle of the register clock, the output from the summing circuit is incremented by the value of the phase increment. The output from phase register 203 is applied to look-up table 205. Look-up table 205 converts the value output from phase register 203 from a number representing the relative phase of the output signal to a value that represents the amplitude of a sinusoidal signal at that point in the cycle that corresponds with the phase value. It should be clear that the faster the register clock runs, the higher the frequency of the output signal. Likewise, the larger the phase increments, the higher the frequency.

Therefore, either the phase increment or the register clock can be used to determine the frequency that will be generated. The A/D converter 207 converts the value output from look-up table 207 into a corresponding analog voltage level.

In accordance with the present invention, memory device 209 is coupled to the output from phase register 203. Prior to the synthesizer changing frequencies, the value of the phase register 203 is stored in memory 209. When the frequency is again generated at a later time, the value stored in memory 209 is coupled to offset processor 211. Offset processor 211 adjusts the value to account for the amount of time that has elapsed since that frequency was last generated. That is, in one embodiment, offset processor 211 determines the number of cycles of the phase clock that would have occurred during the period that has elapsed from the time that frequency was last generated. This number is multiplied by the value of the phase increment. The product of this multiplication is added to the value stored in memory 209. The resulting sum is then restored into the phase register 203.

Figure 3:
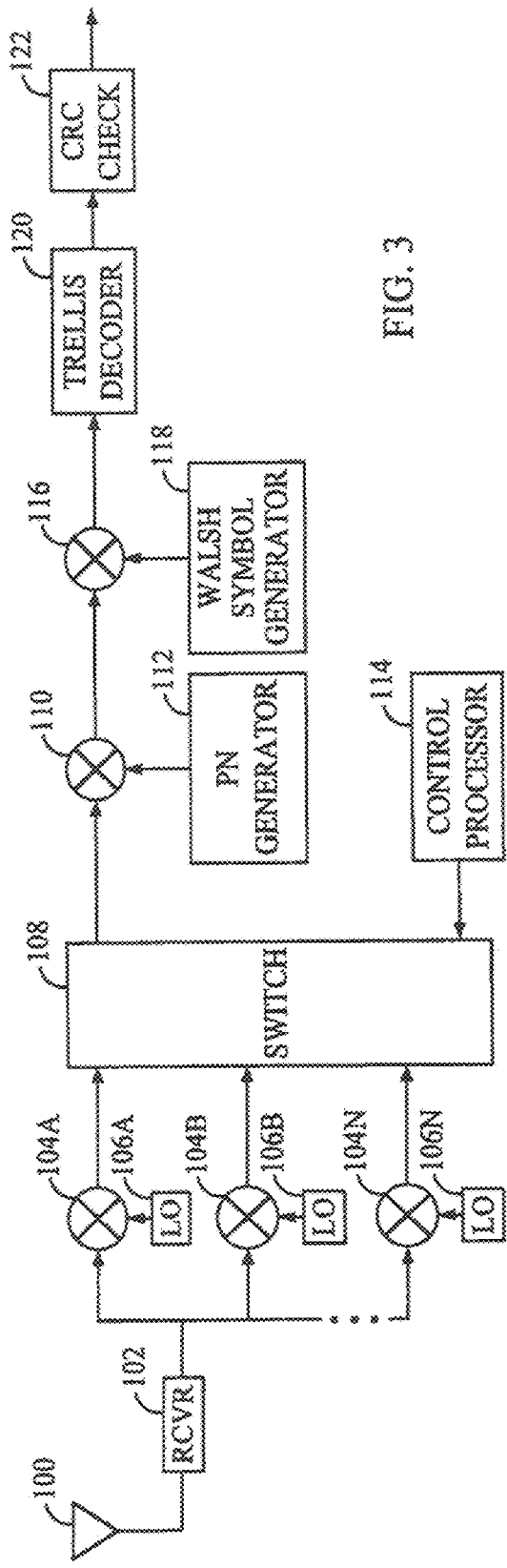
FIG. 3 is a diagram illustrating a receiver system in accordance with one embodiment of the present invention which is capable of receiving data transmitted on CDMA channels with center frequencies selected based on a deterministic selection using a bank of local oscillators.

FIG. 3 illustrates a first implementation of a receiver designed to receive spread spectrum data which changes frequency in accordance with the transmission systems of FIGS. 1 and 2. Referring to FIG. 3, the transmitted signal is received by antenna 100 and provided to receiver (RCVR) 102. Receiver 102 filters and amplifies the signal and provides the received signal to a bank of down converters 104a-104n. Each downconverter 104a-104n is driven by a corresponding local oscillator 106a-106n. Switch 108 selects the signal to provide to dechannelizer 110 in accordance with a selection signal provided by control processor 114 which is a time delayed version of selection signal provided by control processors 22 and 70.

The down converted signals are provided to switch 108. Switch 108 selectively provides one of the down converted signals to descrambler 110. Descrambler 110 unscrambles the downconverted signal in accordance with a pseudorandom sequence provided by PN generator 112. The descrambled sequence is provided to dechannelizer 116 which dechannelizes the signal in accordance with sequence provided by sequence generator 118. In one embodiment, sequence generator 118 is an orthogonal Walsh sequence generator. Data is provided to decoder 120 which decodes the data based on the type of encoder used by the transmission system. In one embodiment, the encoder is a convolutional encoder and decoder 120 is a trellis decoder. The decoded data is provided to CRC check element 122 which tests to determine whether the decoded check bits correspond to the decoded information bits. If they do, then the data is provided to the user, otherwise an erasure is declared.

Figure 4:
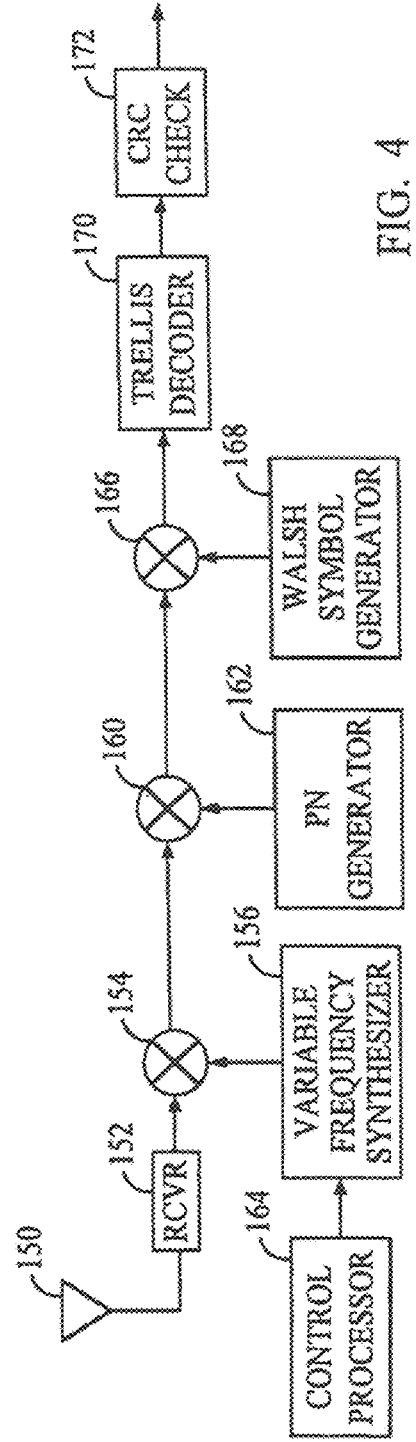
FIG. 4 is diagram illustrating a receiver system in accordance with an alternative embodiment of the present invention which is capable of receiving data transmitted on CDMA channels with center frequencies selected based on a deterministic selection using variable frequency synthesizer.

FIG. 4 illustrates a second embodiment of a receiver designed to receive spread spectrum data which is changes frequency in accordance with the transmission systems of FIGS. 1 and 2. Referring to FIG. 4, the transmitted signal is received by antenna 150 and provided to receiver (RCVR) 152. Receiver 152 filters and amplifies the signal and provides the received signal to down converter 154. Downconverter 154 is driven by variable frequency synthesizer 156. Variable frequency synthesizer 156 outputs a frequency in accordance with a selection signal provided by control processor 164. In accordance with one embodiment of the present invention, variable frequency synthesizer 156 is a DDS similar to the DDS that is shown in FIG. 2b. The DDS performs the same store and restore function that was described above with respect to the transmitter in order to ensure that the transmit and receive signals will remain in phase synchronization. That is, the value that is held in phase register 203 is stored in memory 209 each time the frequency is about to change. The value of stored in memory 209 is then offset and restored into phase register 203 when the frequency of the DDS returns to that frequency. In this way, the receiver remains synchronized to the transmitter as the frequency alternates between the different frequencies that are to be generated by the DDS.

The downconverted signal is provided to descrambler 160. Descrambler 160 unscrambles the downconverted signal in accordance with a pseudorandom sequence provided by PN generator 162. The descrambled sequence is provided to dechannelizer 166 which dechannelizes the signal in accordance with the sequence provided by sequence generator 168. In one embodiment, sequence generator 168 is an orthogonal Walsh sequence generator. The data output from dechannelizer 166 is provided to decoder 170 which decodes the data based on the type of encoder used by the transmission system. In one embodiment, the encoder is a convolutional encoder and decoder 170 is a trellis decoder. The decoded data is provided to CRC check element 172 which tests to determine whether the decoded check bits correspond to the decoded information bits. If they do the data is provided to the user, otherwise an erasure is declared.

Figure 5:
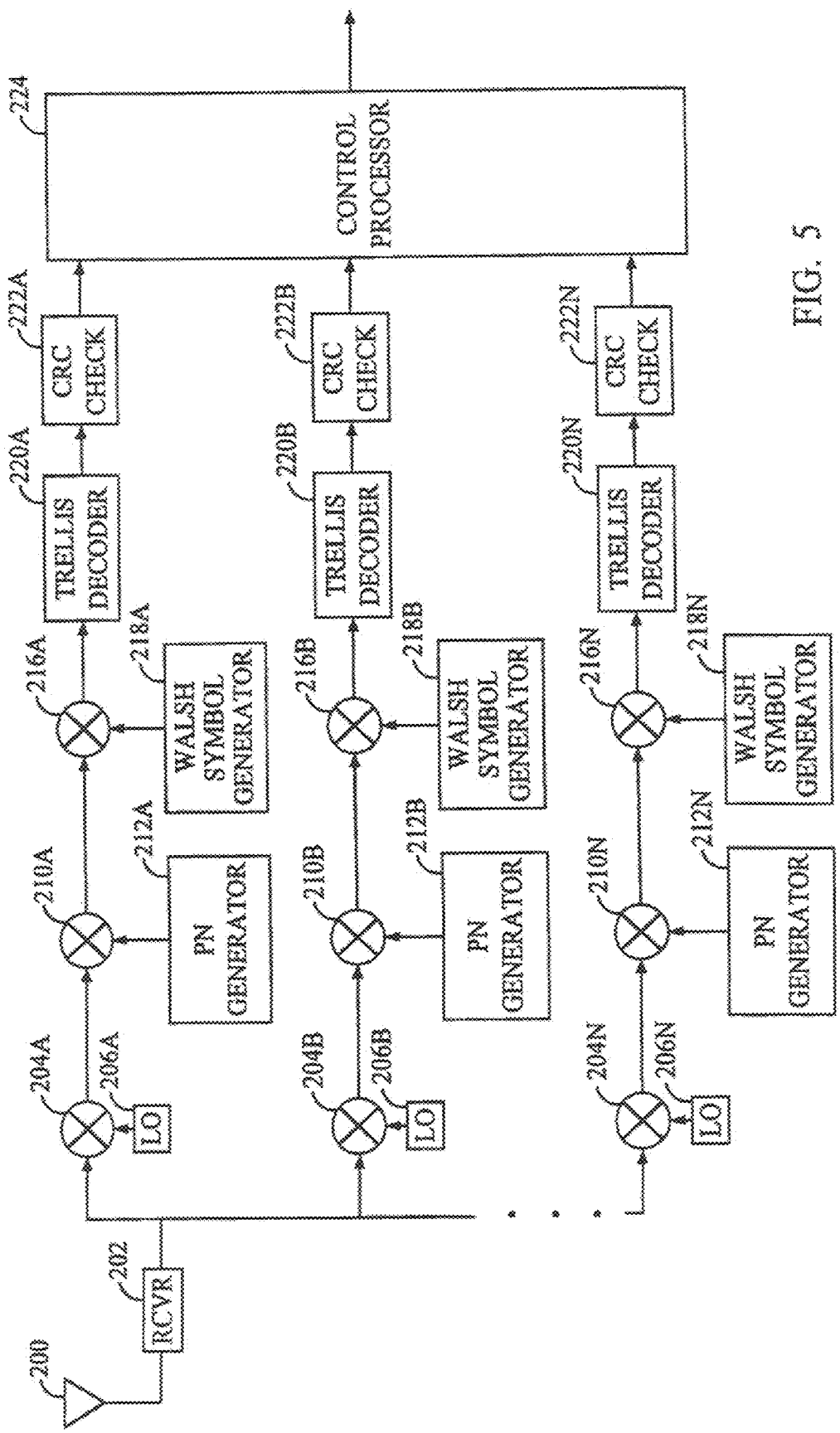
FIG. 5 is diagram illustrating a receiver system in accordance with another alternative embodiment which is capable of receiving data transmitted on CDMA channels with center frequencies selected based on a deterministic selection wherein the signal is down converted at each possible center frequency and then one is selected based on the quality metrics of the frame.

FIG. 5 illustrates a third embodiment of a receiver designed to receive spread spectrum data which changes frequency in accordance with the transmission systems of FIGS. 1 and 2. Referring to FIG. 5, the transmitted signal is received by antenna 200 and provided to receiver (RCVR) 202. Receiver 202 filters and amplifies the signal and provides the received signal to a bank of downconverters 204a-204n. Each downconverter 204a-204n is driven by a corresponding local oscillator 206a-206n.

Each downconverted signal is provided to a corresponding descrambler 210a-210n. Descramblers 210a-210n unscramble the down-converted signal in accordance with a pseudorandom sequence provided by a corresponding PN generator 212a-212n. The descrambled sequences are provided to dechannelizers 216a-216n which dechannelizes the signal in accordance with sequence provided by a corresponding sequence generator 218a-218n. In one embodiment, sequence generators 218a-218n are orthogonal Walsh sequence generators. The despread data is provided to decoders 220a-220n which decode the data based on the type of encoder used by the transmission system. In one embodiment, the encoder is a convolutional encoder and decoders 220a-220n are trellis decoders. The decoded data is provided to CRC check element 222a which determines whether the decoded check bits correspond to the decoded information bits.

A set of values (commonly referred to as "quality metrics"), calculated to determine the quality of a received frame of data, is provided to control processor 224 for each decoded stream of data. Control processor 224 outputs to the user the frame having the best quality as determined by the values of the quality metrics. If all of the decoded frames are of inadequate quality as determined by the values of the quality metrics, then an erasure is declared. Examples of quality metrics which can be used by control processor 224 to select the frame include: (1) accumulated branch metrics from trellis decoders 220, (2) symbol error rate (SER), and (3) CRC check results.

Figure 6:
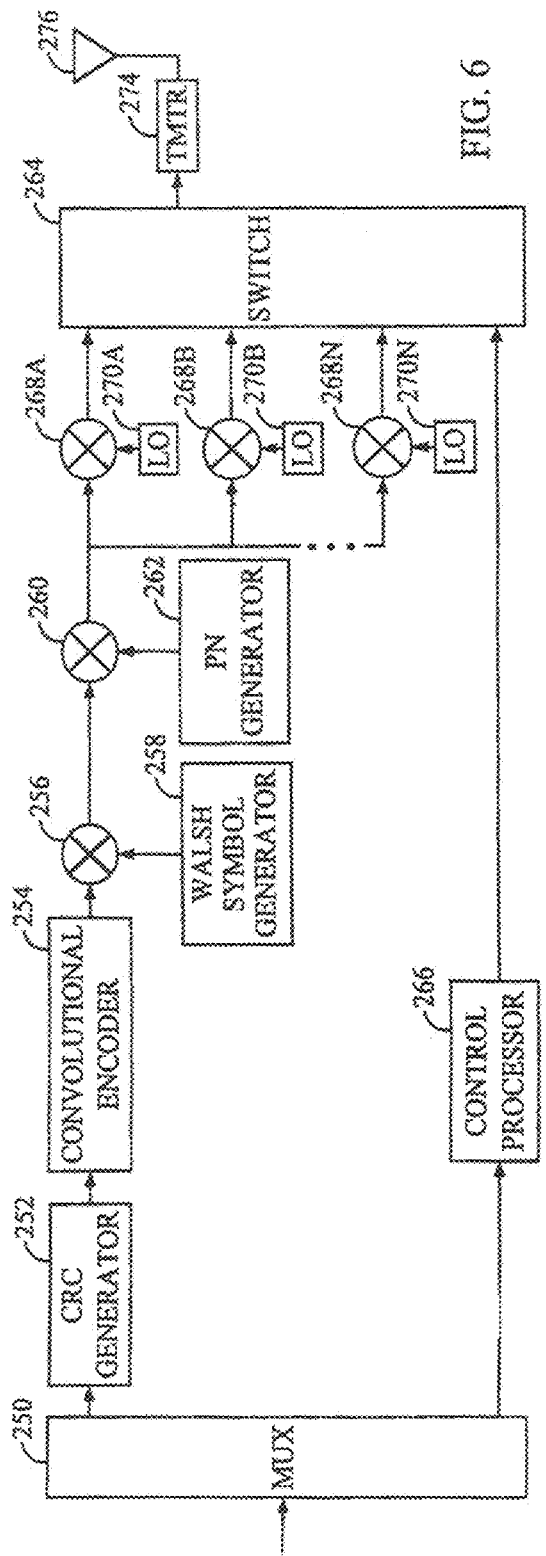
FIG. 6 is a diagram illustrating an embodiment wherein the CDMA channel is frequency hopped based on a subset of the information bits to be transmitted using a bank of up converters.
Figure 6A:
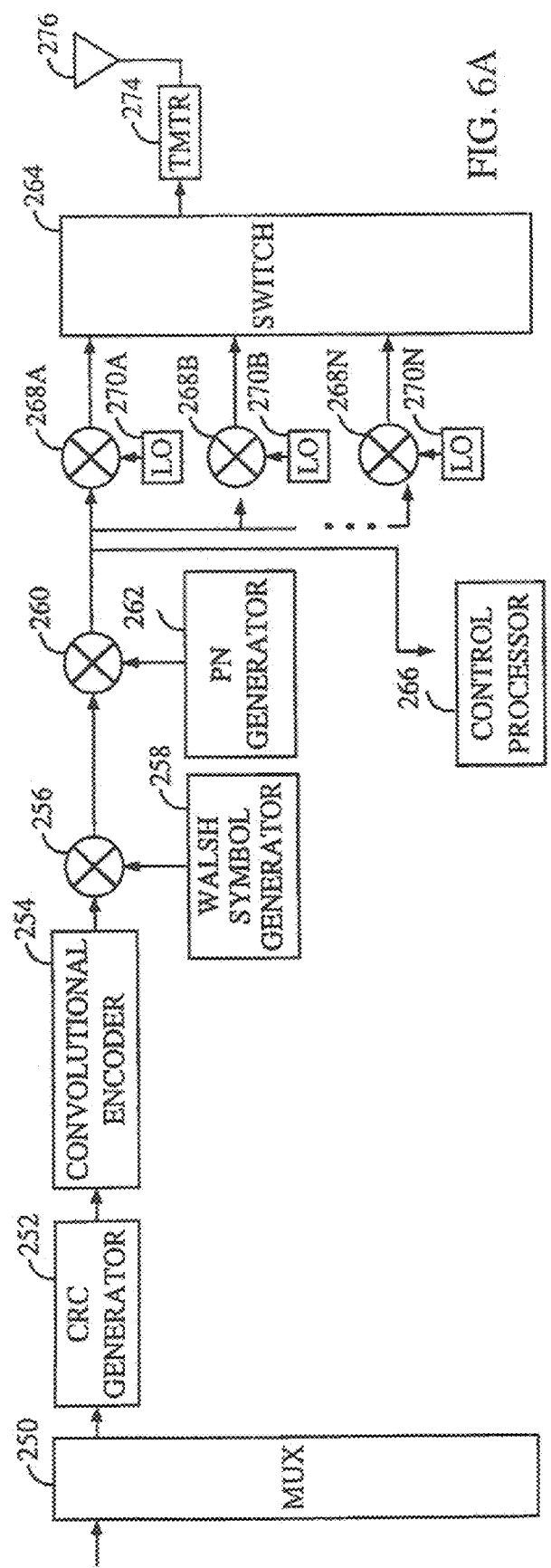
FIG. 6A is a diagram illustrating an embodiment wherein the CDMA channel is frequency hopped based on a scrambled subset of the information bits to be transmitted using a bank of up converters.

FIG. 6 illustrates an alternative embodiment of the present invention, wherein the CDMA channels change frequency in accordance with a subset of the information bits to be transmitted. The information data to be transmitted is provided to multiplexer (MUX) 250, which provides a subset of bits for selecting the center frequency on a first output and the remaining bits to be transmitted to a second output. In one embodiment, the information bits are used to select the frequency for transmission. However, the packetized bits from CRC generator 252 or the encoded symbols from convolutional encoder 254 can be used to select the upconversion frequency. The subset of information bits used to select the upconversion frequency are provided to control processor 266. In accordance with the subset of information bits, control processor 266 generates a command signal to switch 264. In order to provide randomization of the transmitted frequency, a preferred embodiment would scramble the subset of information bits provided to control processor 266. Such scrambling provides makes the transmitted frequency random. In a preferred embodiment, a subset of the bits from PN generator 262 is used to scramble the bits supplied to control processor 266 as shown in FIG. 6A.

The remaining information bits to be transmitted are provided to CRC generator 252, which generates and appends a set of bits that can be used to check whether the decoded data was received correctly at the receiver. The bits from CRC generator 252 are provided to encoder 254. In one embodiment, encoder 254 is a convolutional encoder, though the present invention is equally applicable to any error correction encoder. Convolutional encoders are well known in the art.

The encoded symbols are then provided to channelizer 256 which channelizes the encoded symbols in accordance with a sequence provided by sequence generator 258. In one embodiment, sequence generator 258 is a Walsh symbol generator that provides sequences of symbols in accordance with orthogonal Walsh sequences. The Walsh sequence data is provided to scrambling means 260 which scrambles the data in accordance with a pseudorandom sequence provided by PN generator 262. Such channelizers and sequence generators are well known in the art and are described in detail in the aforementioned U.S. Pat. No. 5,103,459.

The scrambled data is provided to a bank of mixers 268a-268n. Each mixer 268a-268n is driven by a corresponding local oscillator 270a-270n. The upconverted data from each mixer 268a-268n is provided to switch 264. Switch 264 selects one of the upconverted signals to provide to transmitter (TMTR) 274. The upconverted signal that is provided to transmitter 274 is selected in accordance with the selection signal provided by control processor 266.

Figure 7:
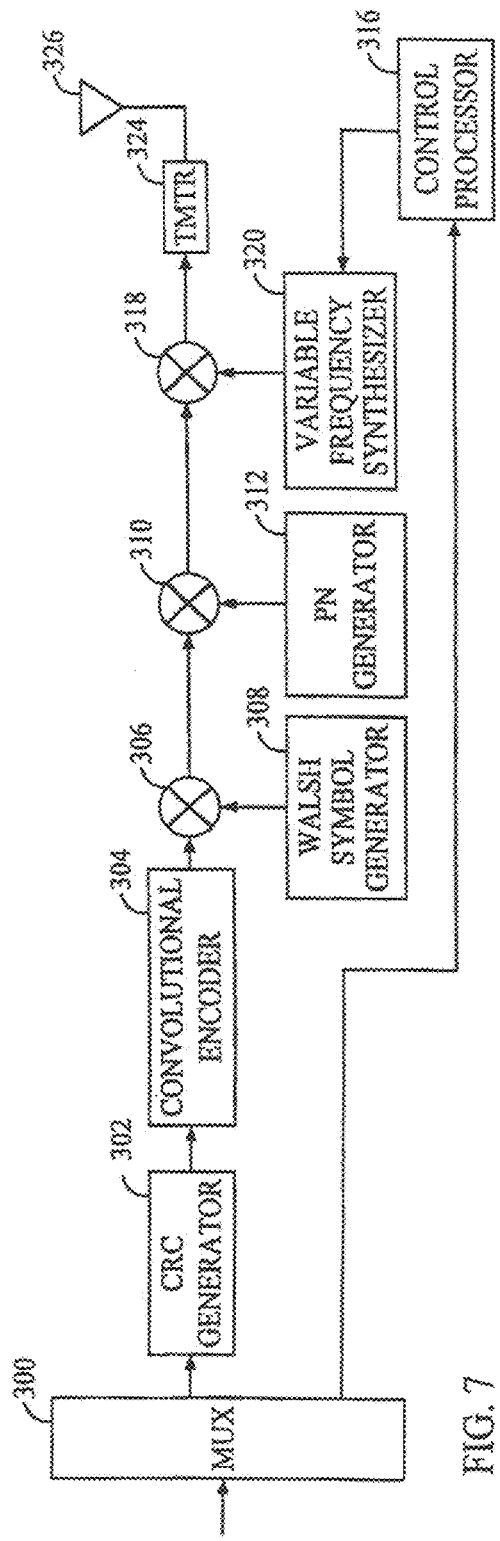
FIG. 7 is a diagram illustrating an exemplary implementation of the second embodiment wherein the CDMA channel is frequency hopped based on a subset of the information bits to be transmitted using a variable frequency synthesizer.

FIG. 7 illustrates an alternative implementation of the second embodiment of the present invention wherein the CDMA channels are frequency hopped in accordance with a subset of the information bits to be transmitted. The information data to be transmitted is provided to multiplexer (MUX) 300, which provides the a subset of bits for selecting the center frequency on a first output and the remaining bits to be transmitted to a second output. In one embodiment, the information bits are used to select the frequency for transmission. However, the packetized bits from CRC generator 302 or the encoded symbols from convolutional encoder 304 can be used to select the upconversion frequency. The subset of information bits used to select the upconversion frequency are provided to control processor 316. In accordance with the subset of information bits, control processor 316 generates and provides a signal to variable frequency synthesizer 320. In accordance with one embodiment of the present invention, the synthesizer 320 is a DDS having a memory for storing phase values when the frequency changes, as described above and illustrated in FIG. 2b.

The remaining information bits to be transmitted are provided to Cyclic Redundancy Check (CRC) generator 302. CRC generator 302 generates and appends a set of bits that can be used to check the correctness of the decoded data at the receiver. The bits from CRC generator 302 are provided to encoder 304. In one embodiment, encoder 304 is a convolutional encoder.

The encoded symbols are then provided to channelizer 306 which channelizes the encoded symbols in accordance with a sequence provided by sequence generator 308. In one embodiment, sequence generator 308 is a Walsh symbol generator that provides sequences of symbols in accordance with orthogonal Walsh sequences. The Walsh sequence data is provided to scrambling means 310 which scrambles the data in accordance with a pseudorandom sequence provided by PN generator 312. Channelizers and sequence generators are well known in the art and are described in detail in the aforementioned U.S. Pat. No. 5,103,459.

The scrambled data is provided to mixer 318. Mixer 318 is driven by variable frequency synthesizer 320. Variable frequency synthesizer 320 outputs a driving frequency to mixer 318 in accordance with a signal provided by control processor 316. In one embodiment, control processor 316 generates the frequency selection signal based on a subset of the information bits. The upconverted signal is provided to transmitter 324 which filters and amplifies the signal and provides it for transmission through antenna 326.

Figure 8:
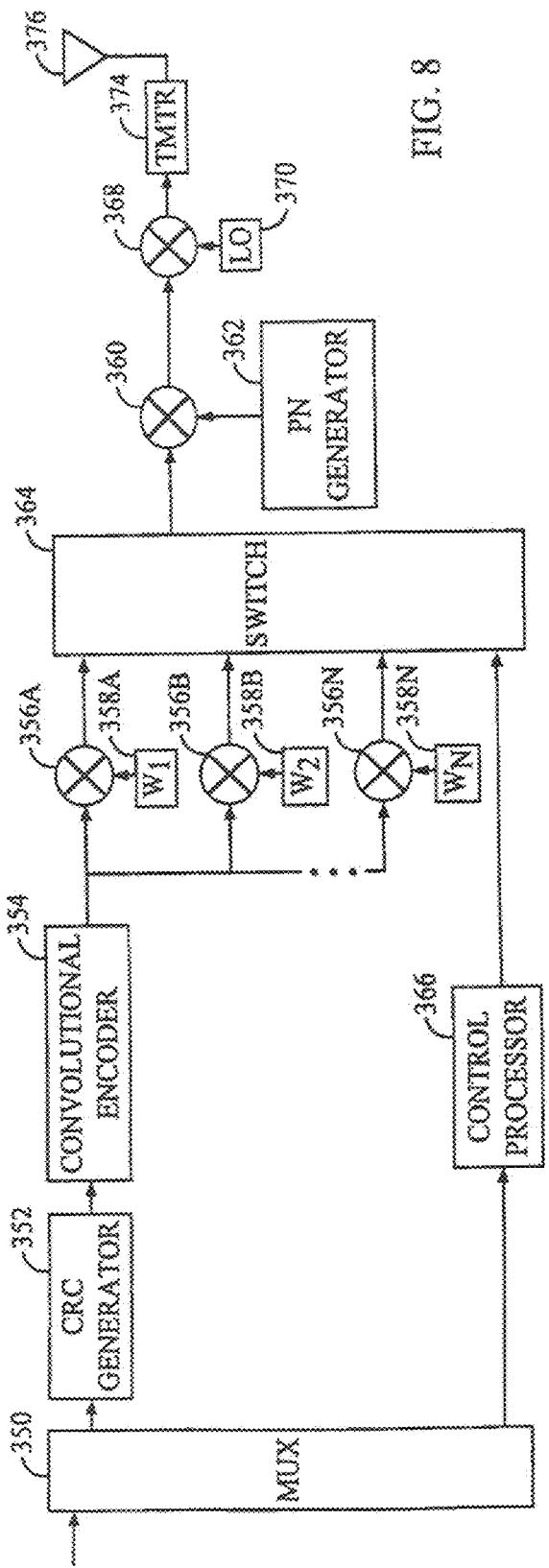
FIG. 8 is a diagram illustrating an exemplary implementation of the third embodiment wherein the CDMA code channel is selected based on a subset of the information bits to be transmitted using a bank of code channel channelizers.

FIG. 8 illustrates an embodiment of the present invention wherein the CDMA channels change code channels in accordance with a subset of the information bits to be transmitted. It should be noted that the embodiment illustrated in FIG. 8 is equally applicable to the case wherein the code channel is selected in accordance with a pseudorandom function analogous to embodiments of the present invention such as those illustrated in FIGS. 1 and 2, wherein the frequency is selected based on a pseudorandom code.

The information data to be transmitted is provided to multiplexer (MUX) 350, which provides a subset of bits for selecting the code channel on a first output and the remaining bits to be transmitted to a second output. In one embodiment, the information bits are used to select the code channel for transmission. However, the packetized bits from CRC generator 352 or the encoded symbols from convolutional encoder 354 can be used to select the code channel. The subset of information bits used to select the code channel are provided to control processor 366. In accordance with the subset of information bits, control processor 366 generates and provides a code channel selection signal to switch 364.

The remaining information bits to be transmitted are provided to CRC generator 352, which generates and appends a set of bits that can be used to check whether the decoded data was correctly received at the receiver. The bits from CRC generator 352 are provided to encoder 354. In one embodiment, encoder 354 is a convolutional encoder, though the present invention is equally applicable to any error correction encoder. The implementation of convolutional encoders is well known in the art.

The encoded symbols are then provided to a bank of code channel channelizers 356a-356n. Each code channel channelizer is provided with a unique sequence from a corresponding sequence generator 358a-358n. In one embodiment, sequence generators 358a-358n are Walsh symbol generators that provides sequences of symbols in accordance with orthogonal Walsh sequences. The Walsh sequence data from each channelizer 356a-356n is provided to switch 364. Switch 364 selectively provides one of the spread data sequences to scrambling means 360. Switch 364 selects which data sequence to provide at its output based on a selection signal from control processor 366. The control processor 366 generates the signal in accordance with a subset of information bits from control processor 366.

Scrambling means 360 scrambles the data in accordance with a pseudorandom sequence provided by PN generator 362. Channelizers and sequence generators are well known in the art and are described in detail in the aforementioned U.S. Pat. No. 5,103,459. The scrambled data is provided to mixer 368. Mixer 368 is driven by a corresponding local oscillator 370. The upconverted data is provided to transmitter (TMTR) 374.

Figure 9:
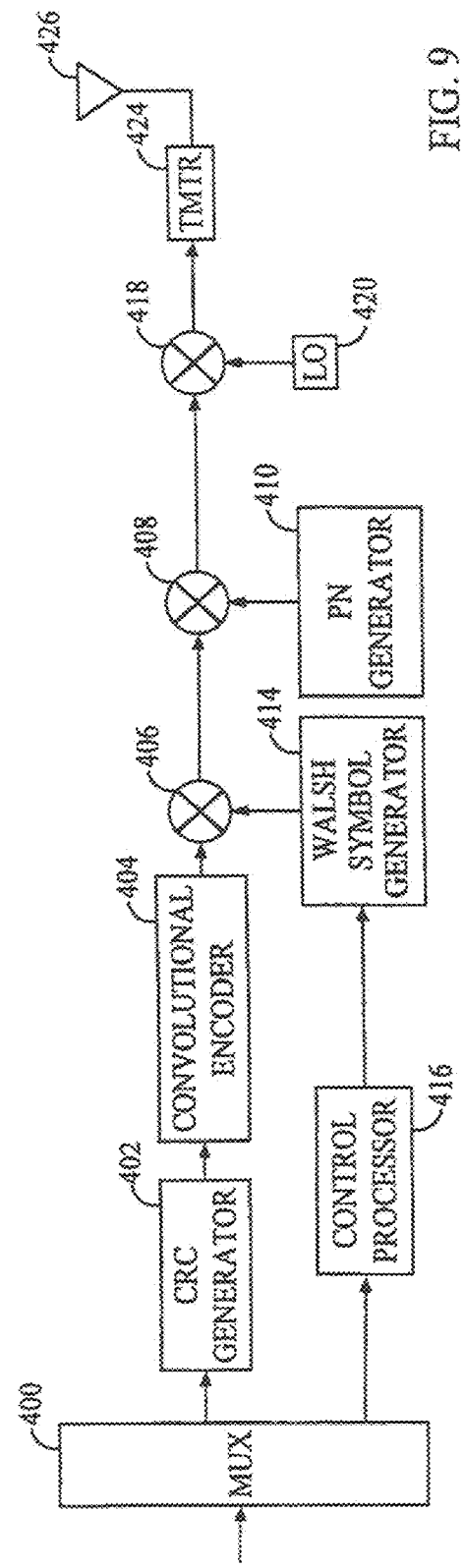
FIG. 9 is a diagram illustrating an exemplary implementation of the third embodiment wherein the CDMA code channel is selected based on a subset of the information bits to be transmitted using a code symbol generator.

FIG. 9 illustrates an alternative embodiment of the present invention, wherein the CDMA channels change code channel in accordance with a subset of the information bits to be transmitted. It should be noted that the embodiment illustrated in FIG. 9 is equally applicable to the case in which the code channel is selected in accordance with a pseudorandom function analogous to the embodiment of the present invention illustrated in FIGS. 1 and 2 in which the frequency is selected based on a pseudorandom code.

The information data to be transmitted is provided to multiplexer (MUX) 400, which provides a subset of bits for selecting the code channel on a first output and the remaining bits to be transmitted to a second output. In one embodiment, the information bits are used to select the code channel for transmission. However, the packetized bits from CRC generator 402 or the encoded symbols from convolutional encoder 404 can be used to select the code channel. The subset of information bits used to select the code channel is provided to control 416. In accordance with the subset of information bits, control processor 416 generates and provides a code channel selection signal to Walsh symbol generator 414.

The remaining information bits to be transmitted are provided to CRC generator 402, which generates and appends a set of bits that can be used to check the correctness of the decoded data at the receiver. The bits from CRC generator 402 are provided to encoder 404. In one embodiment, encoder 404 is a convolutional encoder, though the present invention is equally applicable to any error correction encoder. The implementation of convolutional encoders is well known in the art.

The encoded symbols are then provided to channelizer 406. Channelizer 406 is provided with a time varying spreading sequence from corresponding variable sequence generator 414. In one embodiment, variable sequence generators 414 provides sequences in accordance with a predetermined set of orthogonal Walsh sequences. The Walsh sequence data from channelizers 406 is provided to scrambler 408 which scrambles the data in accordance with a pseudorandom sequence provided by PN generator 410. As noted above, such channelizers and sequence generators are well known in the art and described in detail in the aforementioned U.S. Pat. No. 5,103,459. The scrambled data is provided to mixer 418. Mixer 418 is driven by a corresponding local oscillator 420. The upconverted data is provided to transmitter (TMTR) 374 for transmission through antenna 426.

Figure 10:
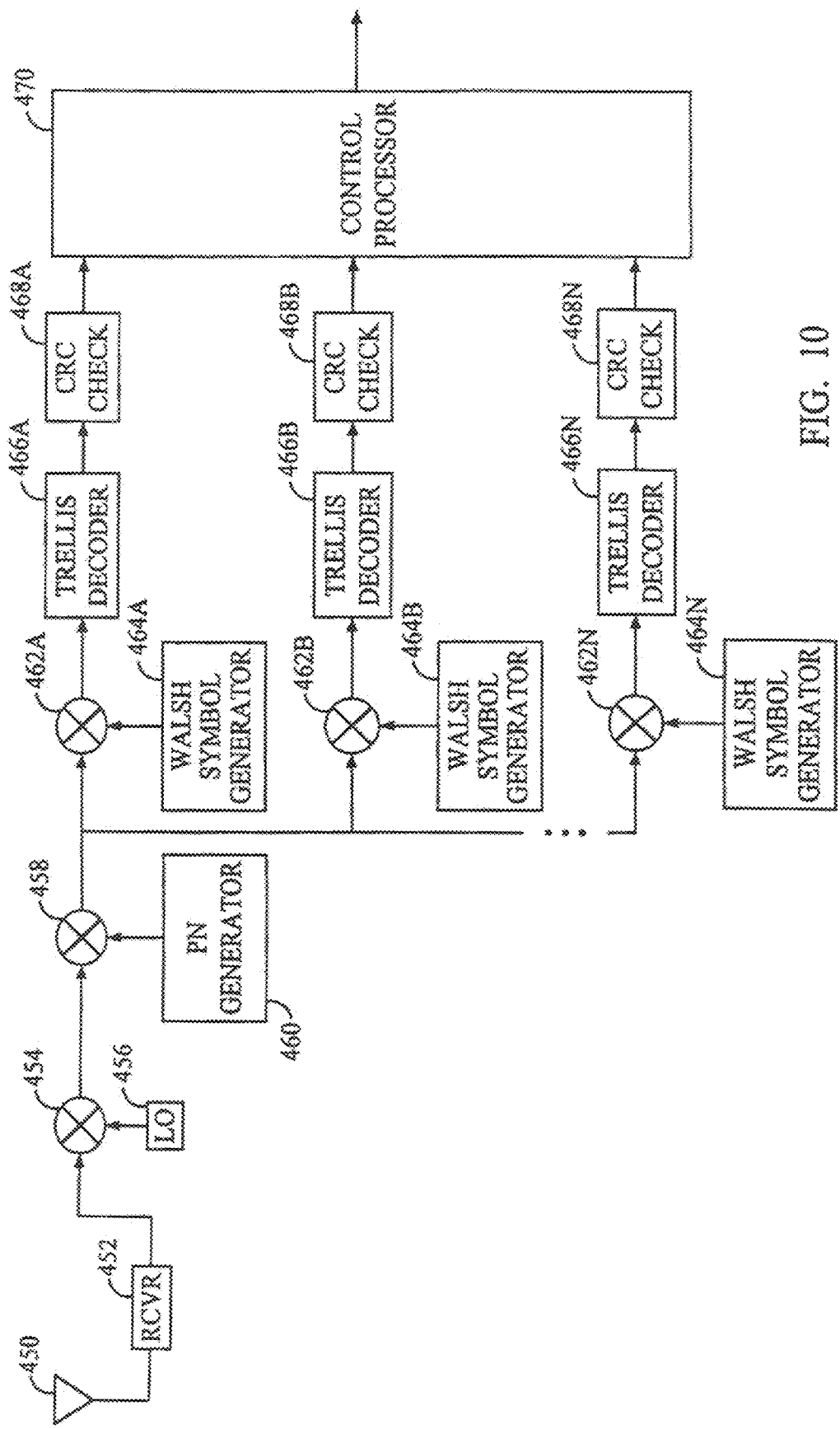
FIG. 10 is diagram illustrating the third implementation of a receiver system capable of receiving data transmitted on a plurality of CDMA code channels wherein the signal is despread with each possible code sequence and then one is selected based on the quality metrics of the frame.

FIG. 10 illustrates a receiver for receiving a signal in accordance with the present invention, wherein the CDMA channels change code channel in accordance with a subset of the information bits to be transmitted. The signal is demodulated in accordance with all possible code channel sequences and the received signal is selected from all of the demodulated signals through an analysis of values (commonly referred to as "metrics") calculated to determine the quality of the received signal. The transmitted signal is received by antenna 450 and provided to receiver (RCVR) 452. Receiver 452 filters and amplifies the signal and provides the received signal to downconverter 454. Downconverters 454 is driven by local oscillator 456.

The downconverted signal is provided to a descrambler 458. Descrambler 458 unscrambles the down-converted signal in accordance with a pseudorandom sequence provided by a corresponding PN generator 460. The descrambled sequences are provided to the bank of dechannelizers 462a-462n which dechannelizes the signal in accordance with sequence provided by a corresponding sequence generator 464a-464n. In one embodiment, sequence generators 464a-464n are an orthogonal Walsh sequence generators. The data is provided to decoders 466a-466n which decodes the data based on the type of encoder used by the transmission system. In one embodiment, the encoder is a convolutional encoder and decoders 466a-466n are trellis decoders. The decoded data is provided to CRC check elements 468a-468n which determine whether the decoded check bits correspond to the decoded information bits.

For each decoded stream of data and a set of quality metrics is provided to control processor 470. Control processor 470 selects for output to the user, the frame with the best quality based on the values of the set of quality metrics. If all of the decoded frames have inadequate quality as determined by the values of the metrics, then an erasure is declared. Examples of quality metrics which can be used by control processor 470 to select the frame, include: (1) accumulated branch metrics from trellis decoders 466a-466n, (2) symbol error rate (SER), and (3) CRC check results.

Figure 11:
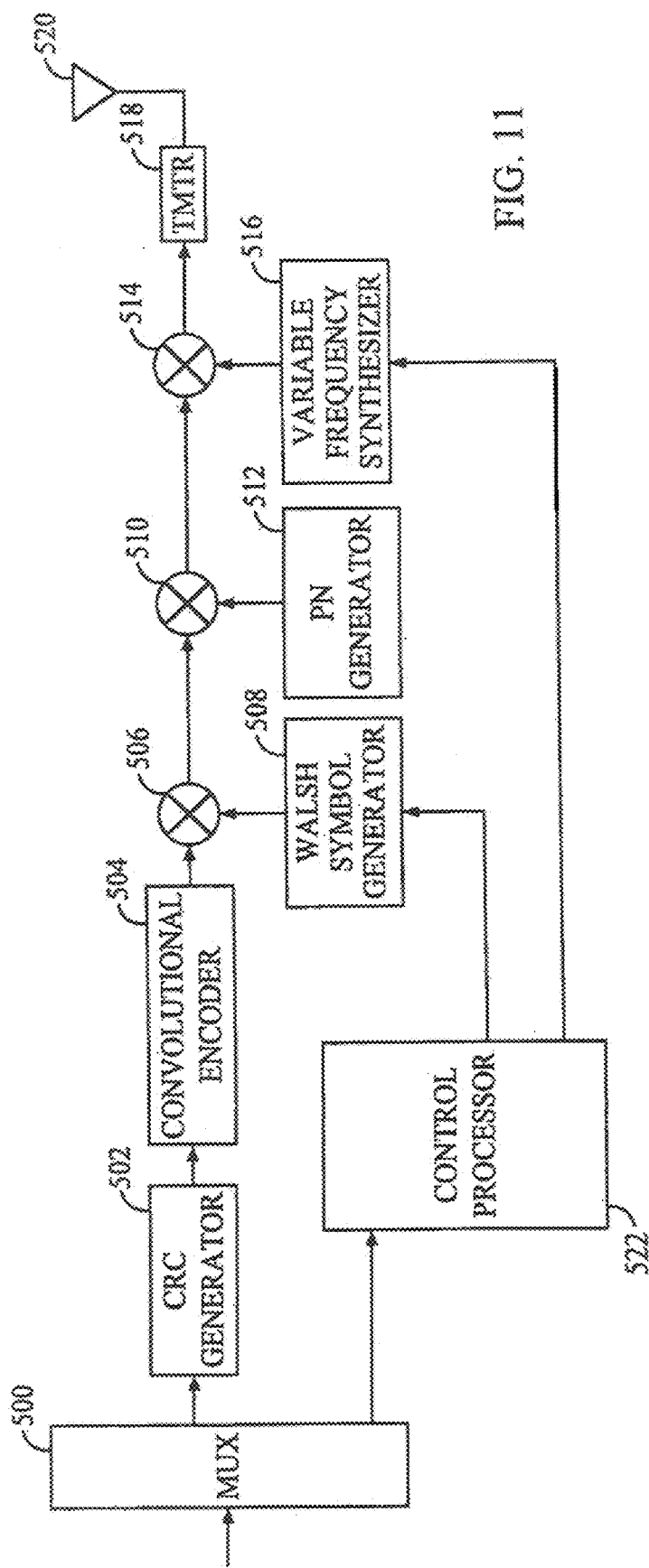
FIG. 11 is a diagram illustrating an exemplary implementation of the third embodiment wherein the CDMA code channel and the center frequency are selected based on a subset of the information bits to be transmitted using a code symbol generator.

FIG. 11 illustrates the another embodiment of the transmission system of the present invention wherein both the modulation sequence and upconversion frequency is selected in accordance with a subset of the information bits to be transmitted. It should be noted that the embodiment illustrated in FIG. 11 is equally applicable to the case wherein the code channel and frequency of upconversion are selected in accordance with a deterministic function. This can be done by programming control processor 522.

The information data to be transmitted is provided to multiplexer (MUX) 500, which provides a subset of bits for selecting the code channel and the frequency of upconversion and the remaining bits to be transmitted on a third output. In alternative embodiments, the packetized bits from CRC generator 502 or the encoded symbols from convolutional encoder 504 can be used to select the code channel and the frequency of the upconversion. The subset of information bits used to select the code channel and the frequency of the upconversion are provided to control processor 522. In accordance with the subset of information bits, control processor 522 provides a code channel selection signal to Walsh symbol generator 508 and provides a frequency selection signal to variable frequency synthesizer 516.

The remaining information bits to be transmitted are provided to CRC generator 502, which generates and appends a set of bits that can be used to determine whether the decoded data received at the receiver is correct. The bits from CRC generator 502 are provided to encoder 504. In one embodiment, encoder 504 is a convolutional encoder, though the present invention is equally applicable to any error correction encoder. Convolutional encoders are well known in the art.

The encoded symbols are then provided to channelizer 506. Channelizer 506 is provided with a time varying spreading sequence from corresponding variable sequence generator 508. In one embodiment, variable sequence generators 508 provides sequences in accordance with a predetermined set of orthogonal Walsh sequences. The Walsh sequence data from channelizer 506 is provided to scrambler 510 which scrambles the data in accordance with a pseudorandom sequence provided by PN generator 512. Channelizers and sequence generators are well known in the art and are described in detail in the aforementioned U.S. Pat. No. 5,103, 459. The scrambled data is provided to mixer 514. Mixer 514 is driven by a variable frequency synthesizer 516. Variable frequency synthesizer 516 generates and provides and driving frequency in accordance with a frequency selection signal from control processor 522 which selects the driving frequency in accordance with a subset of the information bits to be transmitted. The upconverted data is provided to transmitter (TMTR) 518 for transmission through antenna 520.

Figure 12:
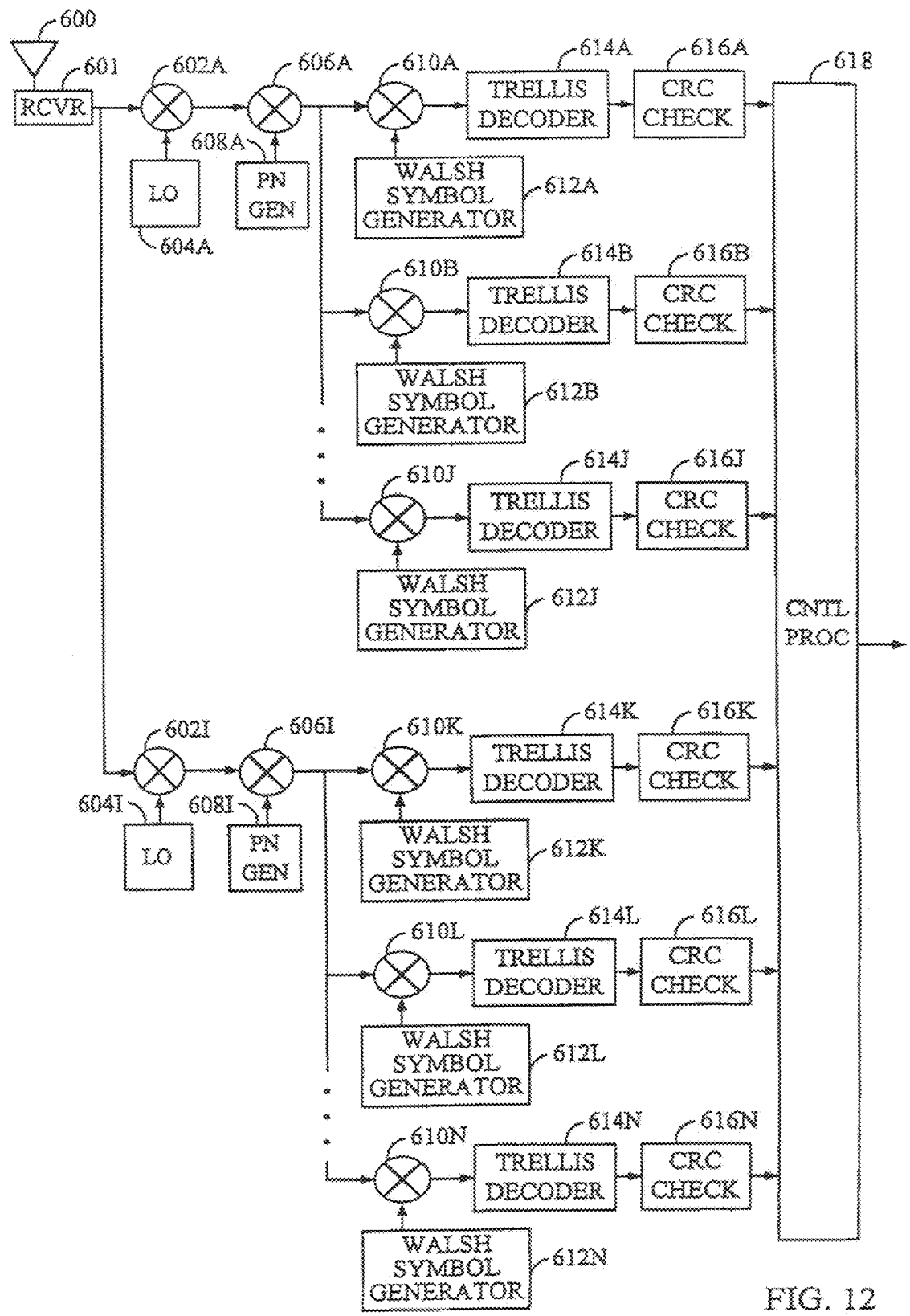
FIG. 12 is diagram illustrating the third implementation of a receiver system capable of receiving data transmitted on a plurality of CDMA code channels and frequencies wherein the signal is despread with each possible code sequence and down converted with each possible frequency and then one is selected based on the quality metrics of the frame.

FIG. 12 illustrates a receiver designed to receive spread spectrum data which changes frequency and code channel in accordance with a subset of the transmitted data.

Referring to FIG. 12, the transmitted signal is received by antenna 600 and provided to receiver (RCVR) 601. Receiver 601 filters and amplifies the signal and provides the received signal to a bank of downconverters 602a-602i. Each downconverter 602a-602i is driven by a corresponding local oscillator 604a-604i.

Each downconverted signal is provided to a corresponding descrambler 606a-606i. Descramblers 606a-606i unscramble the down-converted signal in accordance with a pseudorandom sequence provided by a corresponding PN generator 608a-608i. The descrambled sequences from descrambler 606a are provided to dechannelizers 610a-610j and the descrambled sequences from descrambler 606i are provided to dechannelizers 610k-610n which dechannelizes each descrambled sequence according to all sequences. Each dechannelizers 610a-610n is driven by a corresponding sequence generator 612a-612n. In one embodiment, sequence generators 612a-612n are orthogonal Walsh sequence generators. The despread data is provided to decoders 614a-614n which decodes the data based on the type of encoder used by the transmission system. In one embodiment, the encoder is a convolutional encoder and decoders 614a-614n are trellis decoders. The decoded data is provided to CRC check element 616a-616n which determines whether the decoded check bits correspond to the decoded information bits.

For each decoded stream of data and a set of quality metrics for each stream of data is provided to control processor 618. Control processor 618 selects the frame with the best quality to be output to the user, as determined by the values of the metrics. If all of the decoded frames have inadequate quality then an erasure is declared. Examples of quality metrics which can be used by control processor 618 to select the frame, include: (1) accumulated branch metrics from trellis decoders 612a-612n, (2) symbol error rate (SER), and (3) CRC check results.

The previous description of the preferred embodiments is provided to enable any person skilled in the art to make or use the present invention. However, various modifications to these embodiments will be readily apparent to those skilled in the art, and the generic principles defined herein may be applied to other embodiments without the need for further invention. Thus, the present invention is not intended to be limited to the embodiments shown herein, but rather is to be accorded the widest scope consistent with the principles and features recited in the claims which follow.

What is claimed is:

1. A method comprising:
    modulating data;
    scrambling a subset of information bits of the modulated data;
    selecting a frequency in accordance with the modulated, scrambled subset of information bits; and
    upconverting the modulated data using the selected frequency.

2. The method of claim 1, further comprising:
    scrambling another subset of information bits of the data; and
    selecting a code channel in accordance with the another subset of information bits, wherein the data is modulated using the selected code channel.

3. The method of claim 1, further comprising generating a selection signal in accordance with the modulated, scrambled subset of information bits, wherein the frequency is selected in accordance with the selection signal.

4. The method of claim 1, wherein the frequency is selected in accordance with a pseudorandom sequence.

5. The method of claim 1, wherein the upconverting the modulated data comprises using a variable frequency synthesizer to generate the selected frequency.

6. The method of claim 1, wherein the data is modulated using a Walsh code.

7. The method of claim 2, wherein the code channel is selected in accordance with a pseudorandom sequence.

8. The method of claim 5, wherein the variable frequency synthesizer comprises a direct digital synthesizer.

9. An apparatus, comprising:
    means for modulating data to be transmitted;
    means for scrambling a subset of information bits of the modulated data;
    means for selecting a frequency in accordance with the scrambled subset of information bits; and
    means for upconverting the modulated data using the selected frequency.

10. The apparatus of claim 9, further comprising means for selecting a code channel to modulate the data, wherein the data is modulated using the selected code channel.

11. The apparatus of claim 9, further comprising:
    means for scrambling another subset of information bits of the data; and
    means for selecting a code channel in accordance with the another subset of information bits, wherein the data is modulated using the selected code channel.

12. The apparatus of claim 9, further comprising means for generating a selection signal in accordance with the modulated, scrambled subset of information bits, wherein the frequency is selected in accordance with the selection signal.

13. The apparatus of claim 9, wherein the frequency is selected in accordance with a pseudorandom sequence.

14. The apparatus of claim 9, wherein the means for upconverting the modulated data comprises using a means for variable frequency synthesizing to generate the selected frequency.

15. The apparatus of claim 9, wherein the data is modulated using a Walsh code.

16. The apparatus of claim 11, wherein the code channel is selected in accordance with a pseudorandom sequence.

17. The apparatus of claim 14, wherein the means for variable frequency synthesizing comprises a direct digital synthesizer.

18. A computer program product, comprising:
    computer-readable medium comprising:
        code for causing a computer to:
            modulate the data;
            scramble a subset of information bits of the modulated data;
            select a frequency in accordance with the scrambled subset of information bits; and upconvert the modulated data using the selected frequency.

19. The computer program product of claim 18, said code further comprising:
scrambling another subset of information bits of the data; and
selecting a code channel in accordance with the another subset of information bits, wherein the data is modulated using the selected code channel.

20. The computer program product of claim 18, said code further comprising generating a selection signal in accordance with the modulated, scrambled subset of information bits, wherein the frequency is selected in accordance with the selection signal.

21. The computer program product of claim 18, wherein the frequency is selected in accordance with a pseudorandom sequence.

22. The computer program product of claim 18, wherein the upconverting the modulated data comprises using a variable frequency synthesizer to generate the selected frequency.

23. The computer program product of claim 18, wherein the data is modulated using a Walsh code.

24. The computer program product of claim 19, wherein the code channel is selected in accordance with a pseudorandom sequence.

25. The computer program product of claim 22, wherein the variable frequency synthesizer comprises a direct digital synthesizer.

26. An apparatus comprising:
a modulator adapted to modulate data;
a scrambler adapted to scramble a subset of information bits of the modulated data;
a switch adapted to select a frequency in accordance with the modulated, scrambled subset of information bits; and
an upconverter adapted to upconvert the modulated data using the selected frequency.

27. The apparatus of claim 26, further comprising:
a processor further adapted to select a code channel in accordance with the another subset of information bits, wherein the data is modulated using the selected code channel and wherein said scrambler is adapted to scramble another subset of information bits of the data.

28. The apparatus of claim 26, further comprising a processor to generate a selection signal in accordance with the modulated, scrambled subset of information bits, wherein the frequency is selected in accordance with the selection signal.

29. The apparatus of claim 26, wherein the frequency is selected in accordance with a pseudorandom sequence.

30. The apparatus of claim 26, wherein the upconverting the modulated data comprises using a variable frequency synthesizer to generate the selected frequency.

31. The apparatus of claim 26, wherein the data is modulated using a Walsh code.

32. The apparatus of claim 27, wherein the selection signal is generated in accordance with a pseudorandom sequence.

33. The apparatus of claim 30, wherein the variable frequency synthesizer comprises a direct digital synthesizer.

* * * * *